(12) United States Patent
Matsushita et al.

(10) Patent No.: US 7,922,004 B2
(45) Date of Patent: Apr. 12, 2011

(54) DIESEL FILTER

(75) Inventors: Yoshiharu Matsushita, Oyama (JP);
Suminobu Otsubo, Toyota (JP); Yasuji Nishi, Toyota (JP); Satoshi Nagata, Nisshin (JP)

(73) Assignees: Kyosan Denki Co., Ltd., Koga (JP);
Toyota Jidosha Kabushiki Kaisha, Toyota (JP)

( * ) Notice: Subject to any disclaimer, the term of this patent is extended or adjusted under 35 U.S.C. 154(b) by 428 days.

(21) Appl. No.: 11/583,780

(22) Filed: Oct. 20, 2006

(65) Prior Publication Data

US 2007/0090043 A1 Apr. 26, 2007

(30) Foreign Application Priority Data

Oct. 24, 2005 (JP) ................. 2005-308073

(51) Int. Cl.
*B01D 27/00* (2006.01)
*B01D 35/00* (2006.01)
*B01D 35/30* (2006.01)

(52) U.S. Cl. ........ 210/439; 210/443; 210/444; 210/445; 210/451; 210/455

(58) Field of Classification Search ............ 210/451, 210/455
See application file for complete search history.

(56) References Cited

U.S. PATENT DOCUMENTS

| | | | | |
|---|---|---|---|---|
| 2,563,548 A * | 8/1951 | Plante | ............ | 210/444 |
| 4,456,529 A | 6/1984 | Shinaver | | |
| 4,668,393 A * | 5/1987 | Stone | ............ | 210/304 |
| 4,751,901 A * | 6/1988 | Moor | ............ | 123/196 A |
| 4,780,203 A | 10/1988 | Barcy | | |
| 4,824,567 A * | 4/1989 | Turman | ............ | 210/416.4 |
| 4,933,093 A | 6/1990 | Keller | | |
| 5,104,537 A * | 4/1992 | Stifelman et al. | ............ | 210/440 |
| 5,879,543 A * | 3/1999 | Amini | ............ | 210/86 |
| 7,410,575 B1 * | 8/2008 | Crawford et al. | ............ | 210/232 |

FOREIGN PATENT DOCUMENTS

| | | |
|---|---|---|
| EP | 0 267 014 A2 | 5/1988 |
| EP | 1 179 358 A1 | 2/2002 |
| EP | 1 400 271 A1 | 3/2004 |
| JP | U-60-108759 | 7/1985 |
| JP | A 8-291776 | 11/1996 |
| JP | A-10-325373 | 12/1998 |
| JP | A 2003-172224 | 6/2003 |
| JP | A-2005-087930 | 4/2005 |

OTHER PUBLICATIONS

Oct. 14, 2010 Office Action issued in European Patent Application No. 06022075.3.
Nov. 13, 2008 Office Action issued in Japanese Patent Application No. 2005-308073 (with translation).

* cited by examiner

*Primary Examiner* — Krishnan S Menon
*Assistant Examiner* — Benjamin Kurtz
(74) *Attorney, Agent, or Firm* — Oliff & Berridge, PLC (57) ABSTRACT

A diesel filter includes a filter member and a water reservoir formed below the filter member. The filter member has a case, a cap for closing the opening of the case, an element, and an element-holding member for holding an upper part of the element, and is detachably housed in the case. The element-holding member has an opening that allows fuel to flow out, and the fuel introduced from a fuel inlet port to a portion above the element-holding member is then introduced to the water reservoir via a passage formed between the inner peripheral surface of the case and the outer peripheral surface of the element.

15 Claims, 8 Drawing Sheets

DIESEL FILTER

INCORPORATION BY REFERENCE

The disclosure of Japanese Patent Application No. 2005-308073 filed on Oct. 24, 2005, including the specification, drawings and abstract is incorporated herein by reference in its entirety.

BACKGROUND OF THE INVENTION

1. Field of the Invention

The invention relates to a diesel filter provided in a fuel supply system of a vehicle and the like, particularly to a diesel filter that improves water separation performance and/or reduces maintenance costs.

2. Description of the Related Art

Diesel engines have long been used as engines for vehicles and the like. In a diesel engine, a filter filters light oil in a fuel tank, and an injection pump compresses the filtered fuel to a high pressure, and an injector injects the fuel to a combustion chamber of the engine, whereby self-combustion takes place in the combustion chamber.

Incidentally, fuel includes foreign matters, for example, water, dust, and solid undesirable materials such as rust. These foreign matters need to be removed because inclusion thereof results in reduced combustion efficiency and wear of the injector or the like. Diesel filters are, therefore, provided to deal with such problems. More specifically, water content in fuel is classified into dissolved water and free water. Dissolved water causes no negative effects, because it flows smoothly in fuel channels and is consumed together with fuel. Meanwhile, free water may cause some problems as follows. Free water appears in fuel when: rainwater intrudes into the fuel during fueling; water droplets formed by moisture in the air intrude into the fuel; or the water dissolved in the fuel is separated therefrom due to a decrease in fuel temperature. Such free water is large in specific gravity compared to light oil, so that it stagnates in the injection pump and the like, thus generating rust and stick. For this reason, free water particularly needs to be removed using a diesel filter.

Auto parts are required to be easily disassembled taking consideration of cost reduction and environmental conservation. Diesel filters for automobile use are desired to have such structure.

A diesel filter related to the invention will be described. A diesel filter includes a cup-shaped case forming an outer shell, and a cap detachably attached to an upper opening end of the case. The cap is provided with a fuel supply pipe, a fuel discharge pipe, and a hand pump. The supply and discharge of fuel are performed through the fuel supply pipe and the fuel discharge pipe respectively, and air is released from the fuel supply system by means of the hand pump.

Housed in the case is a filter member that includes an element having a fuel passage at the center thereof, and an upper holding member and a lower holding member for holding the upper and lower ends of the element. A water reservoir is formed below the filter member.

Fuel is introduced to the water reservoir through the fuel supply pipe and the fuel passage. The introduced fuel changes its direction by 180° in the water reservoir, and then moves upward. Then, the fuel is filtered by passing through the element and discharged from the fuel discharge pipe. When the flow direction of the fuel changes in the water reservoir, water is separated from the fuel. The separated water has a larger specific gravity than the fuel, so that the water is retained in the water reservoir (see Japanese Patent Application Publication No. JP-A-2003-172224).

Note that the amount of water retained in the water reservoir becomes larger as the flow rate of fuel passing through the element reduces. The experiment using the related art device described above shows that the amount of water retained in the water reservoir is not large when the flow rate of fuel is high, as indicated by, for example, the curve denoted by "CENTER FLOW" in the diagram of FIG. 11. Conceivably, this is because all the fuel flows into the water reservoir through the fuel passage arranged at the center of the element, so that the fuel flowing into the water reservoir strongly strikes the center of the bottom thereof, whereby the free water is pushed up to the bottom of the element, and a portion thereof is discharged from the fuel discharge pipe together with the fuel. Thus, it has been proved that desired water retainability can not be always achieved in the water reservoir of the related art device.

In this related art device, in addition to a sealed position between the case and the cap, two other sealed positions are required between the filtering portion and another member. Thus, additional man-hours and further accuracy are required for assembly work.

Moreover, when the filter member is held by the case and the cap, the filtering portion is held by utilizing the upper and lower surfaces of the filter member. Accordingly, an upper holding member and a lower holding member are essential. Thus, the number of parts of the filter member is increased for these two members. This also leads to a problem that disassembly work becomes complicated at the time of disposal.

A diesel filter, as another related art, includes a cup-shaped case forming an outer shell, and a cap detachably attached to an upper opening end of the case. The cap is provided with a fuel supply pipe, a fuel discharge pipe, and a hand pump. The supply and discharge of fuel are performed through the fuel supply pipe and the fuel discharge pipe respectively, and air is released from the fuel supply system by means of the hand pump.

Housed in the case is a filter member that includes an element and a holding member for holding an upper end of the element. Formed below the filter member is a water reservoir. The holding member includes a first member that constitutes a lower portion thereof and holds the element, a second member arranged above the first member with a space therebetween, and a third member provided on the second member. An inlet port is so provided as to pass through the center of the second member and the third member, while an outlet port is so provided as to pass through the first member to the third member. The case, the element, and the holding member including the first member to the third member are assembled into a single unit by caulking to form a cartridge case. Then, a diesel filter is assembled by fixing the cartridge case to the cap.

Fuel is introduced to the space, from the upper center thereof, between the first member and the second member through the fuel supply pipe and the inlet port. The fuel is then introduced to the water reservoir through a fuel channel formed between an inner peripheral surface of the case and an outer peripheral surface of the element. The introduced fuel changes its direction by 180° in the water reservoir, and moves upward. Then, the fuel is filtered by passing through the element and discharged from a fuel discharge pipe through the outlet port. When the flow direction of the fuel is changed in the water reservoir, water is separated. The separated water has a larger specific gravity than the fuel, so that the water is retained in the water reservoir (see Japanese Patent Application Publication No. JP-A-8-291776).

In this related art device, the degree of water atomization is lower than the related art device firstly described, and therefore the amount of water passing through the element reduces. However, its structure is more complicated and the number of parts is larger than the device firstly described. Further, the unit is assembled by caulking the components, which complicates its disassembly. Accordingly, the related art device is not desirable in terms of environmental friendliness.

SUMMARY OF THE INVENTION

It is an object of the invention to provide a diesel filter capable of improving the water retainability in a water reservoir and/or reducing production cost, as well as enhancing environmental friendliness.

A diesel filter according to a first aspect of the invention includes a case, a cap for closing the opening of the case, and a filter member which includes an element and an element-holding member for holding an upper part of the element and which is detachably housed in the case. In a state where the filter member is housed in the case, a water reservoir is formed below the filter member in the case, and further, a passage is formed between an inner peripheral surface of the case and an outer peripheral surface of the element. The element-holding member has an opening that allows fuel to flow out. The fuel introduced from a fuel inlet port to a portion above the element-holding member is introduced to the water reservoir via a passage formed between the inner peripheral surface of the case and the outer peripheral surface of the element.

According to the first aspect, firstly, a side-flow diesel filter is employed in which the fuel introduced from the fuel inlet port to a portion above the element-holding member is introduced to the water reservoir via the passage formed between the inner peripheral surface of the case and the outer peripheral surface of the element. Thus, the fuel is dispersed and introduced to the water reservoir. The atomization of water in the water reservoir is suppressed and more water can thus be retained in the water reservoir, as compared to the case where a center-flow diesel filter is employed. Secondly, the filter member is detachably housed in the case, so that disassembly can be easily performed at the time of disposal of the diesel filter.

In the diesel filter according to the first aspect, the element may include a wound filter element. Wound filter elements can be produced easily and thus at low cost, as compared to, for example, pleated filter elements. In addition, the filtration area of a wound filter element is larger than that of a pleated filter element, resulting in improved filtration efficiency. Further, the case may be made of metal. In this case, the impact resistance of the case is made high, which increases the degree of freedom of the mounting position of the diesel filter, resulting in further reduction in production cost.

In the diesel filter according to the first aspect, the element-holding member may include a flange provided at an outer periphery of the element-holding member and having notches through which the fuel flows. The flange may be arranged so as to be held by the cap and the case when the opening of the case is closed by the cap. With this arrangement, it is possible to prevent a sealing material (a second sealing material 61) from being cut by excessive compression due to deformation of the case that is caused by collision (impact) and groove formation for retaining the sealing material (the second sealing material 61). Thus, fuel leakage can be prevented. Further, the structure for holding the filter member can be simplified, leading to further reduction in production cost.

In the diesel filter according to the first aspect, the element-holding member may include a plurality of bar ribs that are provided at an outer periphery of the element-holding member so as to extend downwardly. The bar ribs may be arranged to be in contact with and held by a stepped portion of the case when the opening of the case is closed by the cap. With this arrangement, the structure for holding the filter member can be simplified, resulting in further reduction in production cost.

The element-holding member may include an open tube which is provided on a top surface of the element-holding member and through which the fuel flows. The open tube may be arranged so as to be held directly by the cap. With this arrangement, the structure for holding the filter element can be simplified, achieving further reduction in production cost.

The fuel inlet port may be offset from the center of the filter member.

Figure 11:
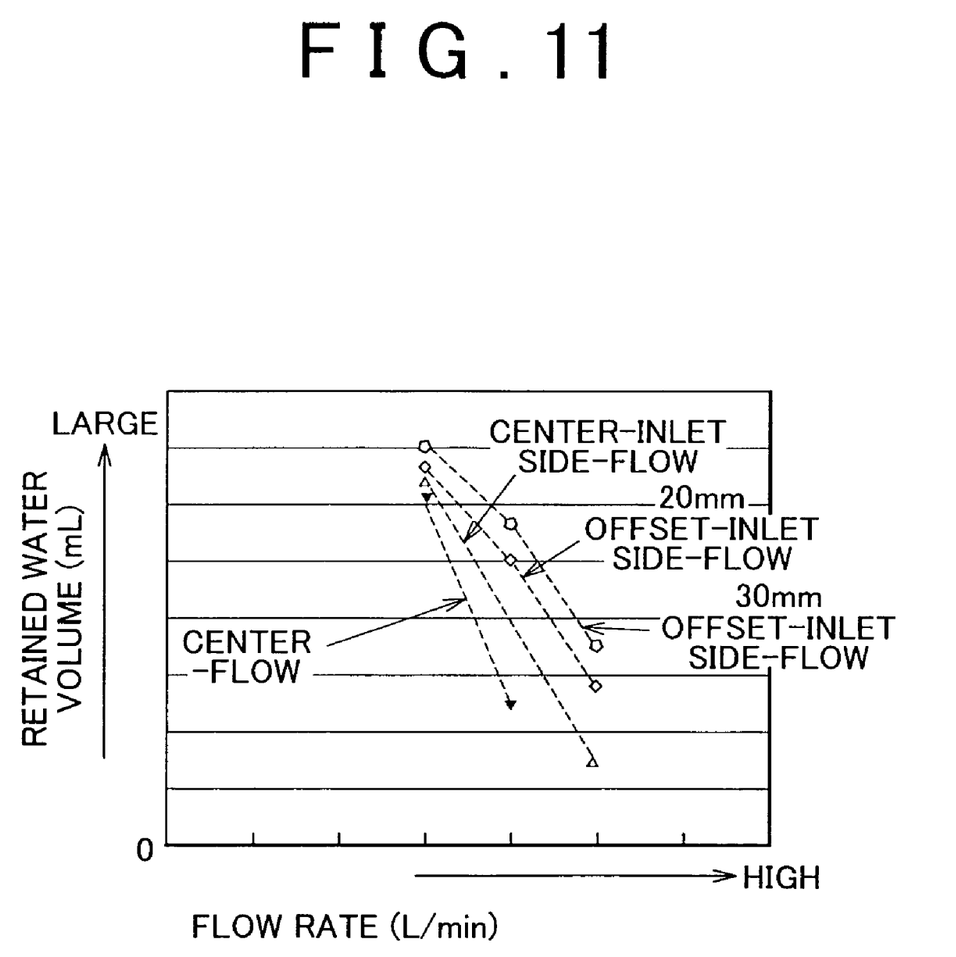
FIG. 11 is a characteristic diagram showing the volume of retained water of a center-flow diesel filter and a side-flow diesel filter.

For example, according to a side-flow diesel filter, fuel is introduced to a water reservoir via a passage provided between an inner peripheral surface of a case and an outer peripheral surface of an element. In this diesel filter, a fuel inlet port is arranged at the center, and water contained in the fuel introduced from the fuel inlet port is substantially evenly dispersed in all directions and then introduced to the water reservoir, allowing the water to be atomized accordingly. Thus, it is considered that, although better than center-flow type diesel filters as indicated in FIG. 11, the water retainability of the diesel filter described as the related art is not sufficient. On the other hand, as indicated by the diagram in FIG. 11, it was confirmed by experiment that offsetting the fuel inlet port from the center of the filter member enhances the water retainability. This fact is analyzed as follows. When the distance between the fuel inlet port and a point at which the fuel begins to fall down is short, the fuel flows only a short distance before falling down, so atomization of the water in the fuel is not much facilitated. As a result, large droplets of water fall down to the water reservoir, and are introduced to the water reservoir as they are. That is, the water retainability in the water reservoir is more enhanced.

The foregoing diesel filter according to the invention may be used as a diesel filter for vehicles. By doing so, it is possible to reduce the production cost of vehicle parts, and consequently that of vehicles, as well as enhancing their environmental adaptability.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

Figure 1:
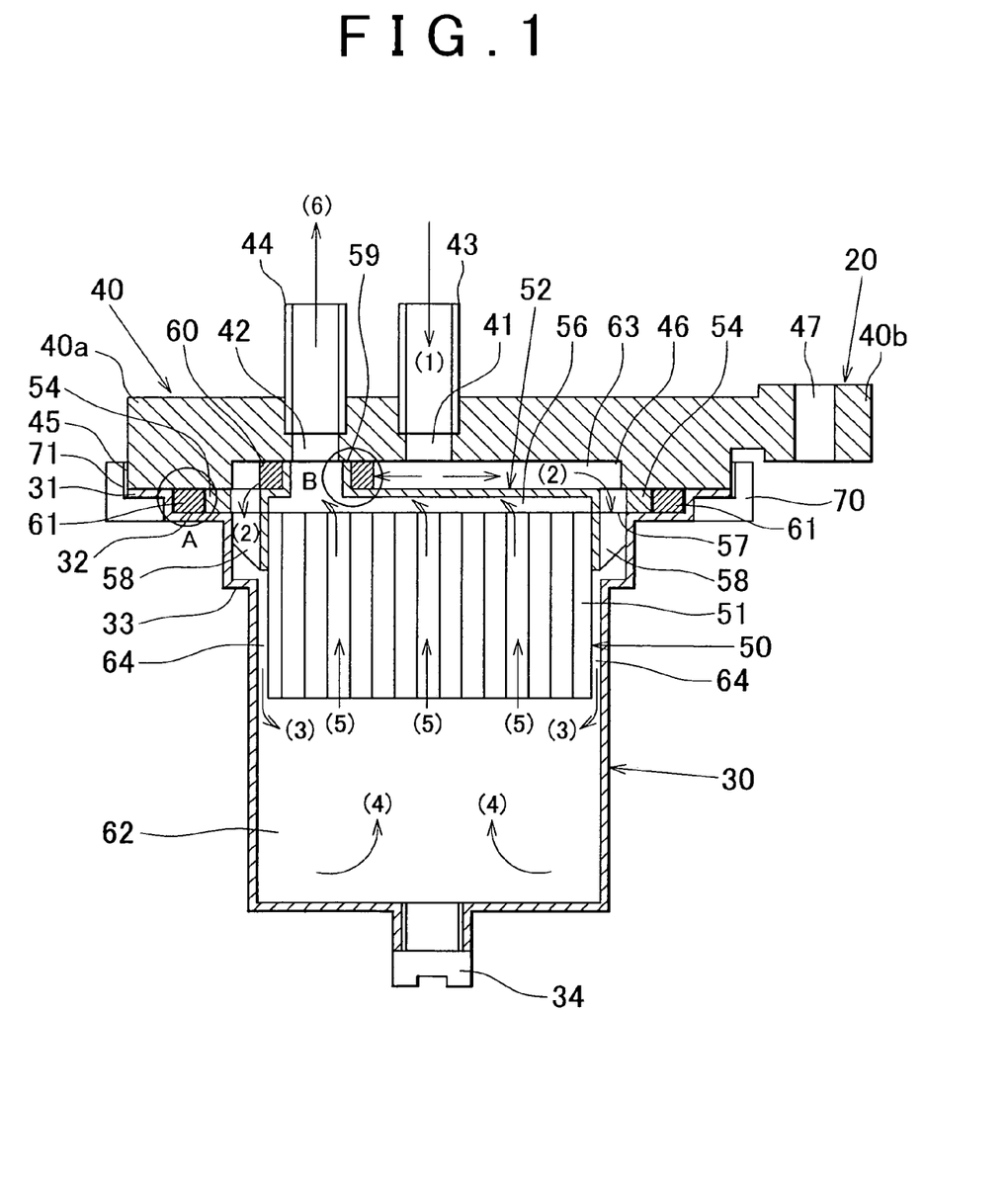
FIG. 1 is a cross sectional view of a diesel filter.
Figure 2:
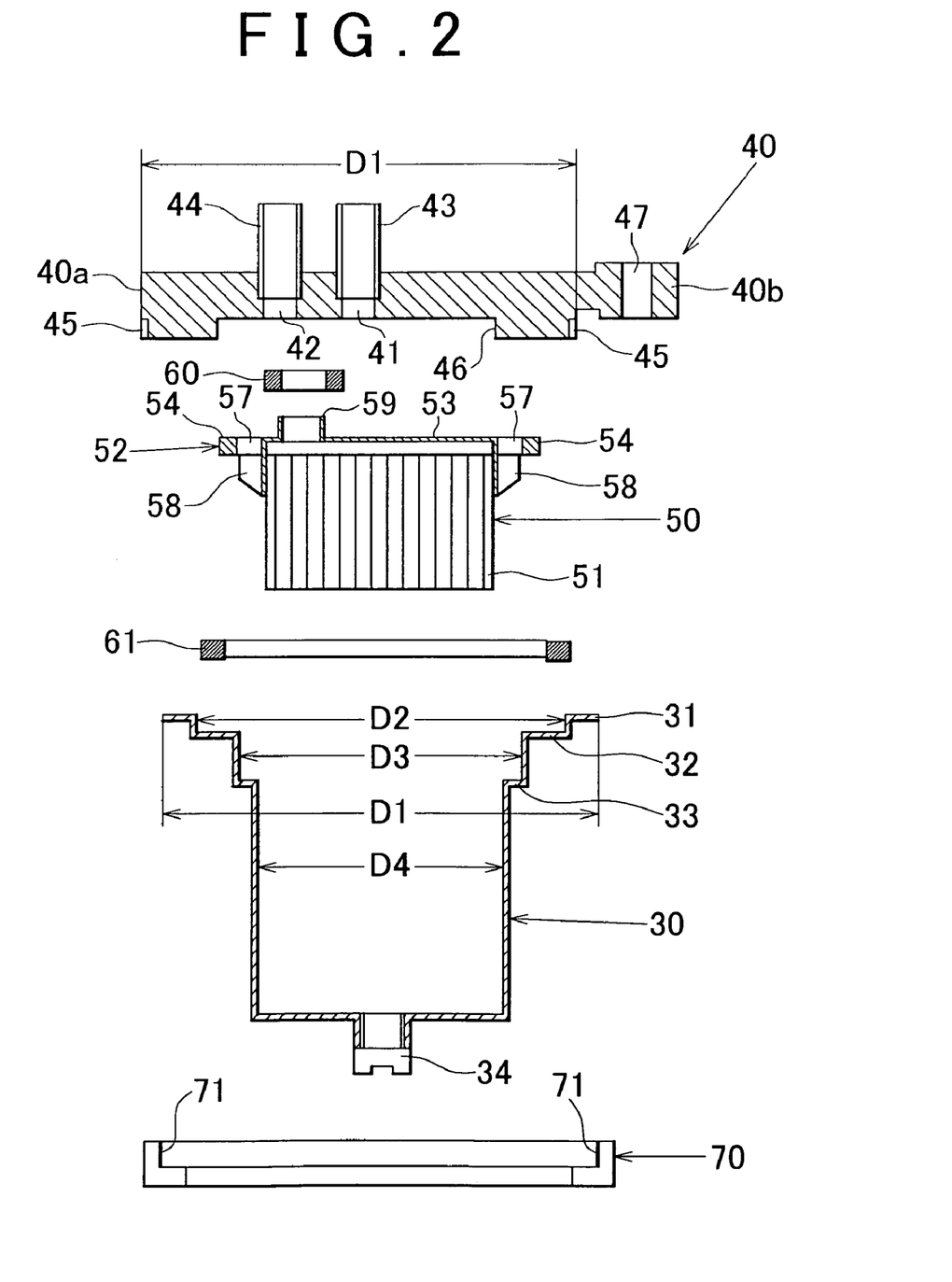
FIG. 2 is a cross sectional view of the diesel filter before assembly.
Figure 3:
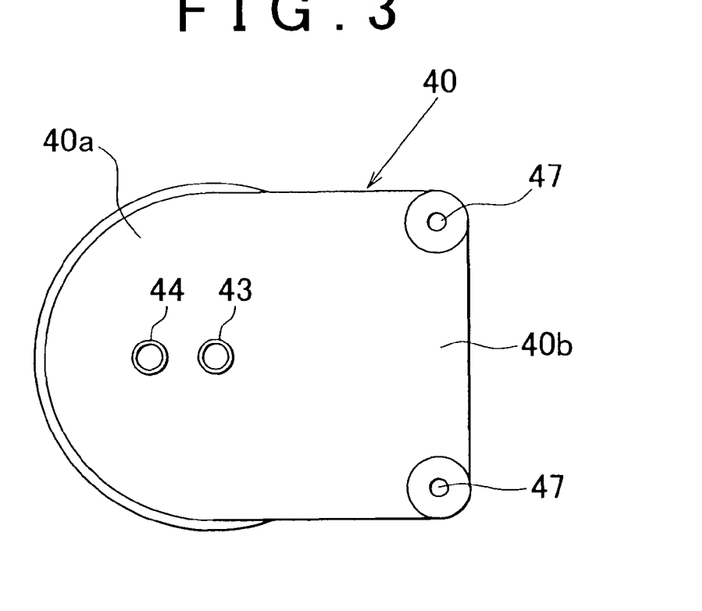
FIG. 3 is a plan view of a diesel filter.
Figure 4:
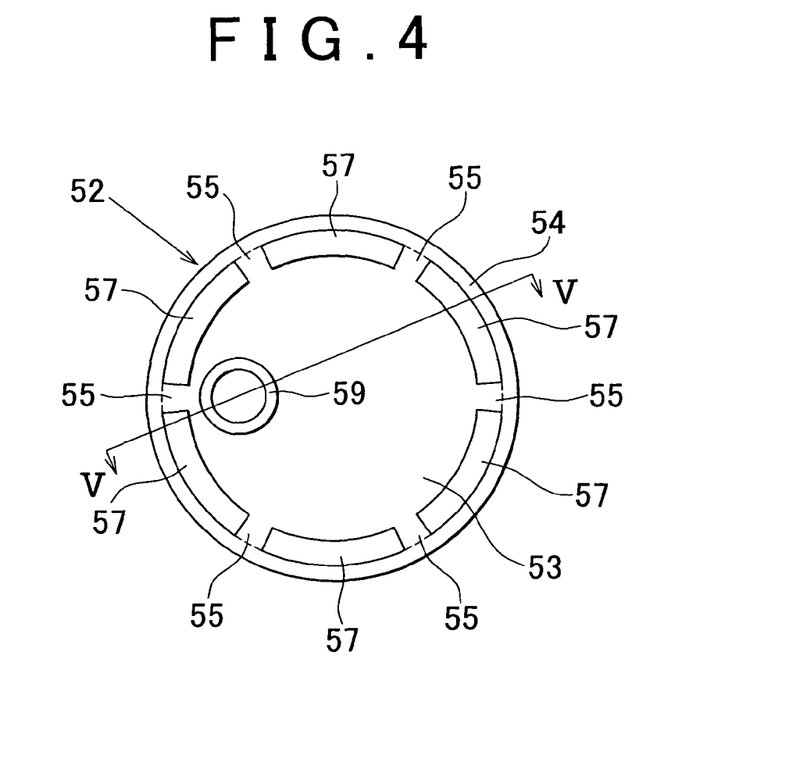
FIG. 4 is a plan view of an element-holding member.
Figure 5:
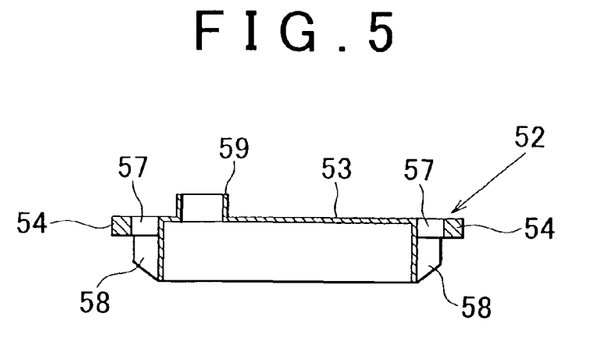
FIG. 5 is a cross sectional view of the element-holding member.

FIG. 1 shows a cross sectional view of a diesel filter, and FIG. 2 shows a cross sectional view of the diesel filter before assembly. FIG. 3 shows a plan view of a cap, and FIG. 4 shows a plan view of an element-holding member. FIG. 5 shows a cross sectional view taken along line V-V of the element-holding member shown in FIG. 4. A diesel filter according to an embodiment of the invention may be employed in a fuel system of any machine, for example, a vehicle, construction machine, forklift, generator, and the like. In the following, however, a diesel filter used in a fuel system of a vehicle will be described.

A diesel filter 20 includes a cup-shaped case 30 forming an outer shell, a cap 40 for closing an upper opening of the case 30, a filter member 50 housed in the case 30, and a fastening member 70 for coupling the case 30 and the cap 40.

The case 30 is a hollow cylindrical member made of metal having an opening at an upper portion thereof. A horizontal ring-shaped upper stepped portion 31 having a diameter of D1 is formed such that it outwardly protrudes from an upper end of the case 30. A horizontal ring-shaped middle stepped portion 32 having a diameter of D2 is formed below the upper stepped portion 31. A horizontal ring-shaped lower stepped portion 33 having a diameter of D3 is formed below the middle stepped portion 32. Further, the case 30 houses the cylindrical filter member 50 having a diameter of D4 that is disposed such that the bottom surface of the filter member 50 is lower than the stepped portion 33, thereby defining a space as a water reservoir 62 to be described later.

Provided at the bottom of the case 30 is a drain cock 34 that is opened when the amount of water in the water reservoir 62 reaches a predetermined value or more so as to discharge the retained water. The discharge of the water is performed, for example, in such a manner that a water level detector such as a float switch is provided in the water reservoir, and the water is discharged manually or automatically in accordance with signals received from the detector.

The case 30 is made of metal, which enhances impact resistance of the case. The case may thus be arranged even at the bottom of the vehicle, which is likely to be hit by road debris, such as pebbles, thrown by the tires. Note that, if a safety place is ensured for the case in terms of impact resistance, the case may be made of plastic instead of metal.

As shown in FIG. 3, the cap 40 made of metal includes a round portion 40a and a square portion 40b, taking a forward-round and backward-square shape. A fuel inlet port 41 and a fuel outlet port 42 are provided in the round shape portion 40a so as to be opened in a vertical direction. A fuel supply pipe 43 is pressed into the fuel inlet port 41, and fuel in a fuel tank (not shown) is supplied through the fuel supply pipe 43. A fuel discharge pipe 44 is pressed into the fuel outlet port 42, and filtered fuel is fed to a fuel injection pump (not shown) through the fuel discharge pipe 44.

The round portion 40a has a substantially the same diameter as the diameter D1 of the upper stepped portion 31 of the case 30. The outer peripheral surface of the lower portion of the round portion 40a is formed with a thread 45 to which the fastening member 70 can be attached. Formed at the bottom of the round portion 40a is a concave portion 46 having the same diameter as the diameter D3 of the lower stepped portion 33 of the case 30. The square portion 40b is integrally formed at one end of the round portion 40a. As shown in FIG. 3, two set holes 47 are provided at left and right ends of the outer periphery of the square portion 40b so as to pass therethrough in the vertical direction. The diesel filter 20 is installed to an appropriate portion in the engine compartment of the vehicle by inserting bolts (not shown) into the set holes 47.

Note that, in the above description, the cap 40 is not provided with a hand pump such as that described as the related art. The cap 40, however, may include a hand pump. Further, the cap 40 is made of metal in the above description. However, when a safe position for installation is secured in terms of impact resistance, the cap 40 may be made of plastic.

The filter member 50 includes an element 51 and an element-holding member 52. The element 51 is a cylindrical member formed by bonding a plain filter element and a wavy filter element and then winding the bonded filter elements. In the element 51, fuel passages are arranged in an up-and-down direction. With this arrangement, fuel flows through many passages formed in the element 51, thereby catching foreign matter contained in the fuel by means of the filter elements. The outer diameter of the element 51 is made smaller than the inner diameter D4 of the water reservoir 62 of the case 30, and when the element 51 is housed in the case 30, a fuel passage 64 is defined therebetween.

The element-holding member 52 is an integrally formed member made of plastic, and includes a body 53, a flange 54, and connecting portions 55. The body 53 is an umbrella-shaped member made by turning a shallow vessel upside down, and is downwardly opened. The inner diameter of the body 53 is substantially the same as the outer diameter of the element 51. The element 51, to the outer periphery of which an adhesive is applied, is inserted into the body 53 such that a small space 56 is left above the element 51. The body 53 and the element 51 are bonded together water-tightly with the adhesive. Thus, the filter member 50 is formed.

Further, an opening 59 for fuel outlet having a tubular shape is stood on the top surface of the body 53. The opening 59 for fuel outlet is provided at a position facing the fuel outlet port 42 of the cap 40. When closing the opening of the case 30 by the cap 40, a ring-shaped first sealing material 60 is put around the outer periphery of the opening 59 for fuel outlet and then sandwiched between the bottom surface of the cap 40 and the top surface of the element-holding member 52, thereby forming a sealed portion illustrated by circle B in FIG. 1. The leakage of the discharged fuel into the inlet side is thus inhibited.

The flange 54 is a ring-shaped member, and its outer diameter is smaller than the inner diameter D2 of the middle stepped portion 32 of the case 30. The inner diameter of the flange 54 is substantially the same as the inner diameter D3 of the lower stepped portion 33 of the case 30. The bottom of the flange 54 is placed and held on the top surface of the middle stepped portion 32. When the cap 40 closes the opening of the case 30, a ring shaped second sealing material 61 is placed and held on the middle steeped portion 32 of the case 30. The outer diameter of the second sealing material 61 is slightly smaller than the inner diameter D2 of the middle stepped portion 32. Next, the flange 54 is placed and held on the middle stepped portion 32 to the inner side of the second sealing member 61. The second sealing member 61 is thus sandwiched between the bottom surface of the cap 40 and the top surface of the middle stepped portion 32, thereby forming a sealed portion illustrated by circle A in FIG. 1. At the same time, the flange 54 is also held by the bottom surface of the cap 40 and the top surface of the middle stepped portion 32.

Note that the order of placing the second sealing material 61 and the flange 54 may be reversed.

The connecting portions 55 are provided for connecting the outer peripheral surface of the upper portion of the body 53 and the inner peripheral surface of the flange 54. As shown in FIG. 4, the connecting portions 55 are radially arranged at 6 positions at equal intervals. Six arc-shaped notches 57, whose shapes are substantially identical to each other, are provided at equal intervals between the respective connecting portions 55. The fuel flows down, via the notches 57, to the fuel passage 64 extending in the up and down direction.

Further, ribs 58 are radially arranged at 6 positions below the connecting portions 55. The ribs 58 are identical in shape and length to the connecting portions 55. The outer diameter of the two opposing ribs 58 is slightly smaller than the inner diameter D3 of the lower stepped portion 33. When the filter member 50 is housed in the case 30, these ribs 58 guide the filter member 50 along the inner peripheral surface of the lower stepped portion 33 of the case 30 so that the axes of the element 51 and the case 3, as well as the axes of the fuel outlet port 42 and the opening 59 for fuel outlet, substantially coincide with each other after housing the filter member 50 in the case 30.

The fastening member 70 is L-shaped in cross section, made of metal or plastic, and formed with a thread 71 on an inner side thereof. When the cap 40 closes the opening of the case 30, the outer surface of the bottom of the cap 40 is placed on the top surface of the upper stepped portion 31 of the case 30. The fastening member 70 is inserted from below the case 30 and then attached to the case 30 by tightening the thread 71 to the thread 45 formed on the outer peripheral surface of the cap 40 until the horizontal surface of the bottom of the fastening member 70 comes in contact with the bottom surface of the upper stepped portion 31. Thus, the case 30 and the cap 40 are integrally fixed.

The filter member 50 is housed in the case 30 such that the element 51 is inserted down to substantially the half depth of the case 30, thereby forming the water reservoir 62 below the element 51, as well as forming an upper chamber 63 between the top surface of the element-holding member 52 and the bottom surface of the concave portion 46 of the cap 40. Further, the fuel passage 64 is formed between the inner surface of the portion of the case 30 having the diameter of D4 and the outer peripheral surface of the element 51. Thus, the fuel supplied to the upper chamber 63 is introduced to the water reservoir 62 via the notches 57 formed between the body 53 and the flange 54 and the fuel passage 64. The fuel inlet port 41 is aligned with, when the opening of the case 30 is closed by the cap 40, substantially the center of the filter member 50, while the fuel outlet port 42 is offset from the center of the filter member 50. However, their arrangement may be modified so as to align the fuel outlet port 42 with substantially the center of the filter member 50 and to offset the fuel inlet port 41 from it.

Next, the flow of the fuel will be described. The fuel introduced from the fuel supply pipe 43 into the diesel filter 20 as shown by arrow (1) is dispersed in all directions in the upper chamber 63. Then, the fuel flows down from the notches 57 to the fuel passage 64 formed between the inner surface of the case 30 and the outer peripheral surface of the element 51 as shown by arrows (2), and is introduced to the water reservoir 62 as shown by arrows (3).

Water content in the fuel is separated in the water reservoir 62, and the fuel free from the water content moves upward as shown by arrows (4). Then, the fuel passes through the element 51 as shown by arrows (5) to remove foreign matter contained in the fuel. After removal of the foreign matter, the fuel reaches the upper space 56 above the element 51. Then, the fuel is discharged via the opening 59 for fuel outlet, the fuel outlet port 42 and the fuel discharge pipe 44 as shown by arrow (6).

The filter member 50 employed in the embodiment of the invention is detachable and includes only two members, namely, the element 51 and the element-holding member 52 provided above the element 51. Thus, production cost can be reduced, and when the element 51 clogs, it is sufficient to replace only the filter member 50 with new one. Moreover, only one sealed portion is provided between the filter member 50 and another member (the cap 40 in this case), which is denoted by circle B in FIG. 1. Accordingly, the structure of the filter element is more simplified than that of the related art.

Figure 6:
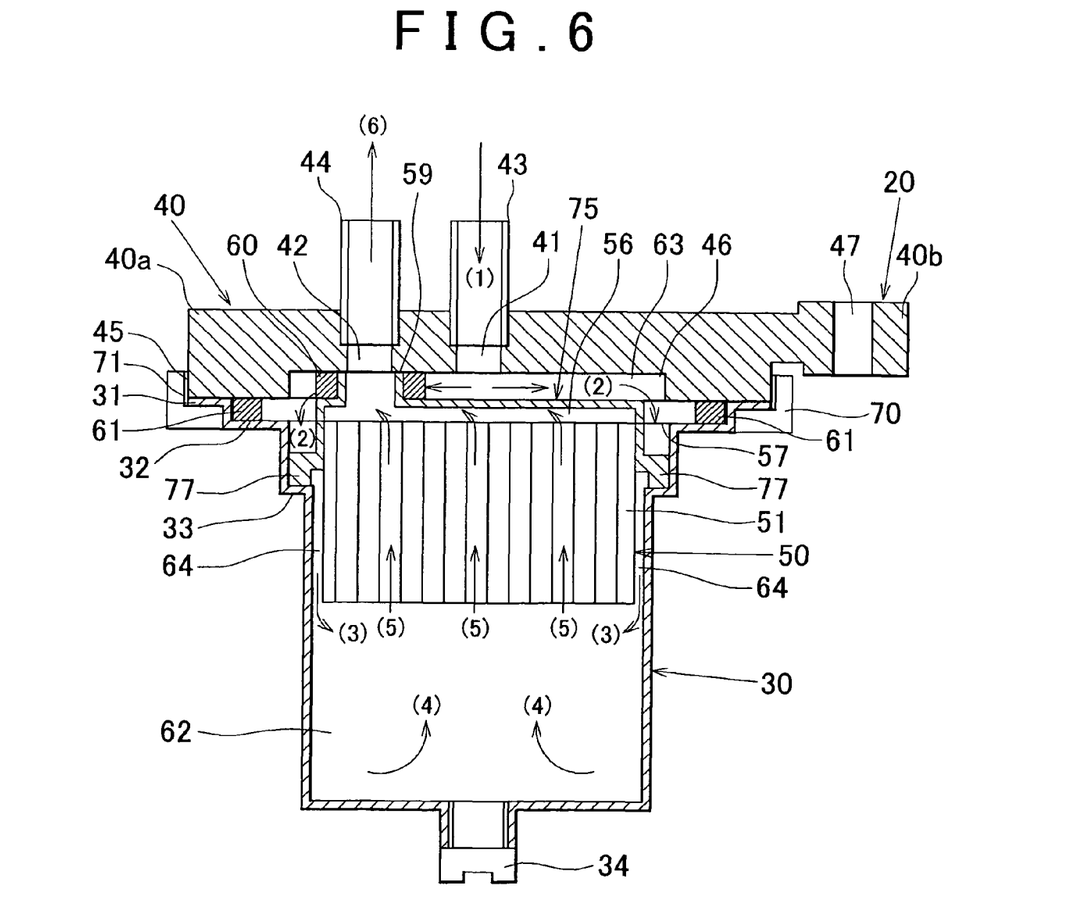
FIG. 6 is a cross sectional view of another diesel filter.
Figure 7:
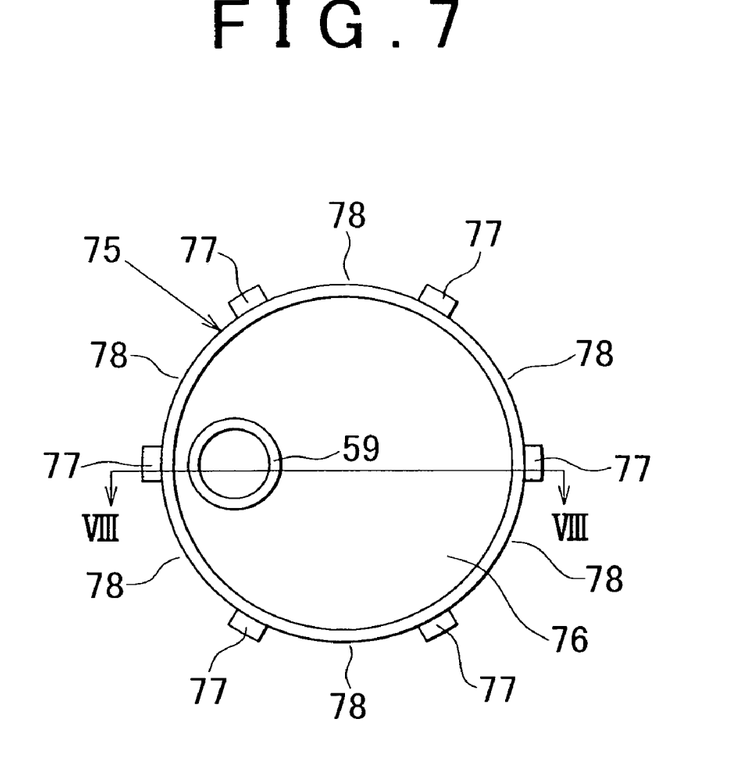
FIG. 7 is a plan view of an element-holding member illustrated in FIG. 6.
Figure 8:
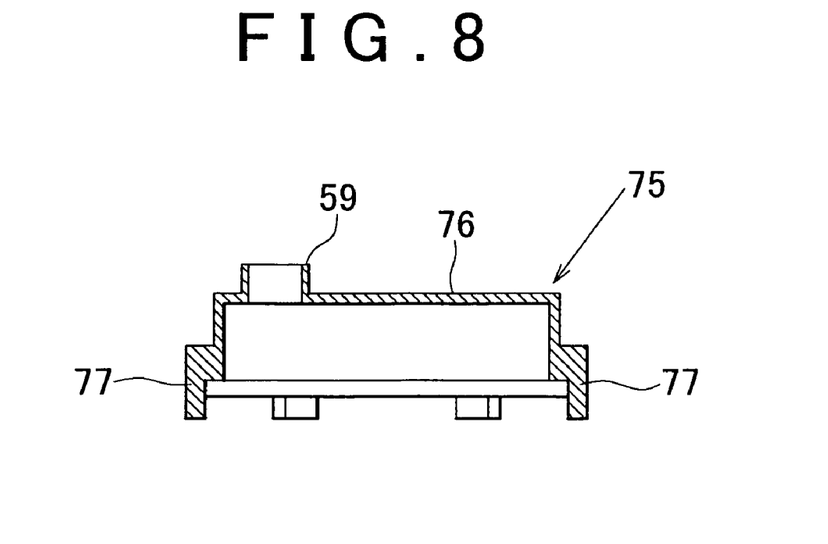
FIG. 8 is a cross sectional view of the element-holding member illustrated in FIG. 6.

FIG. 6 is a cross sectional view showing a second embodiment of the diesel filter. The second embodiment is different from the first embodiment in that the element-holding member is more simplified in structure. FIG. 7 shows a plan view of the element-holding member, and FIG. 8 shows a cross sectional view taken along line VIII-VIII of the element-holding member shown in FIG. 7. Note that elements or members equivalent to those in the first embodiment are denoted by like reference numerals and detailed description thereof will be omitted.

An element-holding member 75 is an integrally formed plastic member like that of the first embodiment, and includes a body 76 and bar ribs 77. The body 76 is an umbrella-shaped member made by turning a shallow vessel upside down, and is downwardly opened. The inner diameter of the body 76 is substantially the same as the outer diameter of the element 51. The element 51, to the outer periphery of which an adhesive is applied, is inserted into the body 76 such that the small space 56 is left above the element 51. The body 76 and the element 51 are bonded together water-tightly with the adhesive. Thus, the filter member 50 is formed.

Further, the opening 59 for fuel outlet having a tubular shape is stood on the top surface of the body 76. The opening 59 for fuel outlet is provided at a position facing the fuel outlet port 42 of the cap 40. When closing the opening of the case 30 by the cap 40, the ring-shaped first sealing material 60 is put around the outer periphery of the opening 59 for fuel outlet and then sandwiched between the bottom surface of the cap 40 and the top surface of the element-holding member 75, thereby forming a sealed portion. The leakage of the discharged fuel into the inlet side is thus inhibited.

The above-mentioned bar ribs 77 are bar-shaped members having a circular or square section, and vertically provided at six positions. The bar ribs are integrally formed with the outer peripheral surface of the lower part of the body 76, identical in shape and length, and radially arranged at equal intervals. The outer diameter of the two opposing bar ribs 77 is slightly smaller than the inner diameter D3 of the lower stepped portion 33 of the case 30. When the filter member 50 is put in the case 30, these ribs 77 guide the filter member 50 along the inner peripheral surface of the lower stepped portion 33 of the case 30, so that the axes of the element 51 and the case 30 coincide with each other after the filter member 50 has been put in position in the case 30. Further, as shown in FIG. 7, notch spaces 78 are formed. The fuel supplied to the top surface of the element-holding member 75 flows into the water reservoir 62 from the notch spaces 78, via the fuel passage 64 formed between the inner surface of the case 30 and the outer peripheral surface of the element 51.

When the filter member 50 is put in the case 30, the lower ends of the bar ribs 77 come in contact with the top surface of the lower stepped portion 33. Then, by closing the opening of the case 30 by the cap 40, the filter member 50 is held by the bottom surface of the cap 40 and the top surface of the lower stepped portion 33. As such, since the second embodiment incorporates no member that is equivalent to the flange 54 of the first embodiment, only the second sealing material 61, which is ring-shaped and has an outer diameter that is slightly smaller than the inner diameter D2 of the middle stepped portion 32, is put on the middle stepped portion 32 of the case when closing the opening of the case by the cap 40.

Next, the flow of the fuel will be described. The fuel introduced from the fuel supply pipe 43 into the diesel filter 20 as shown by arrow (1) is dispersed in all directions in the upper chamber 63. Then, the fuel flows down from the notch spaces 78 to the fuel passage 64 formed between the inner surface of the case 30 and the outer peripheral surface of the element 51 as shown by arrows (2), and is introduced to the water reservoir 62 as shown by arrows (3).

Water content in the fuel is separated in the water reservoir 62, and the fuel free from the water content moves upward as shown by arrows (4). Then, the fuel passes through the element 51 as shown by arrows (5) so that foreign matter contained in the fuel is removed. After removal of the foreign matter, the fuel reaches the upper space 56 above the element 51. Then, the fuel is discharged via the opening 59 for fuel outlet, the fuel outlet port 42 and the fuel discharge pipe 44 as shown by arrow (6).

Also in the second embodiment, the filter member 50 is detachable and includes only two members, namely, the element 51 and the element-holding member 75 provided above the element 51. Thus, production cost can be reduced, and when the element 51 clogs, it is sufficient to replace only the filter member 50 with new one. Moreover, only one sealed portion of the filter member 50 and another member (the cap 40 in this case) is provided as in the case of the first embodiment. Accordingly, the structure of the filter element is more simplified than that of the related art including two sealed portions.

Figure 9:
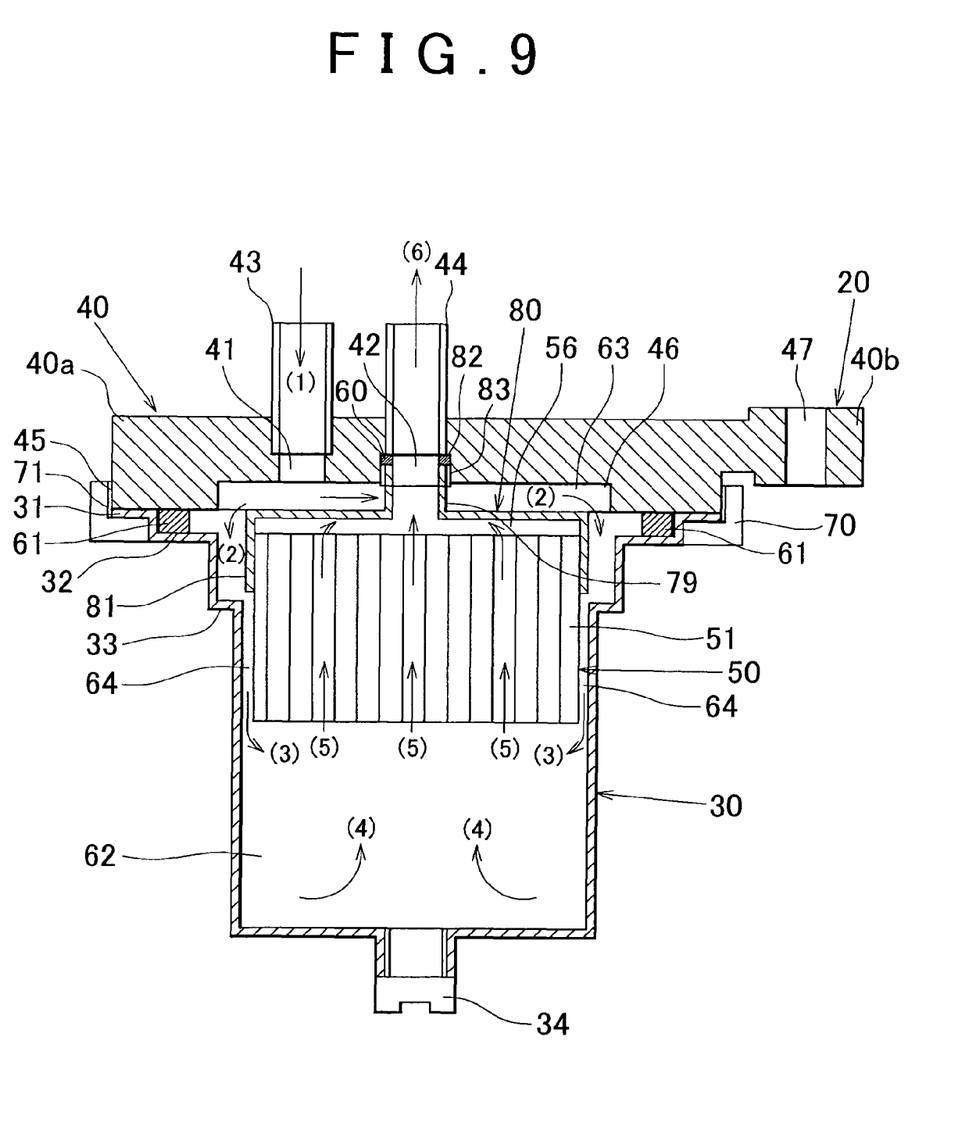
FIG. 9 is a cross sectional view of another diesel filter.

FIG. 9 is a cross sectional view showing a third embodiment of the diesel filter. The third embodiment is different from the first embodiment in that the element-holding member is more simplified in structure. Note that elements or members equivalent to those in the first embodiment are denoted by like reference numerals and detailed description thereof will be omitted.

An element-holding member 80 is an integrally formed plastic member like that of the first embodiment, and includes a body 81. The body 81 is an umbrella-shaped member made by turning a shallow vessel upside down, and is downwardly opened. The inner diameter of the body 81 is substantially the same as the outer diameter of the element 51. The element 51, to the outer periphery of which an adhesive is applied, is inserted into the body 81 such that the small space 56 is left above the element 51. The body 81 and the element 51 are bonded together water-tightly with the adhesive. Thus, the filter member 50 is formed.

An open tube 79 for fuel outlet having a tubular shape is stood on the top surface of the body 81 at a position facing the fuel outlet port 42. The open tube 79 for fuel outlet is formed with a thread 82 at an outer periphery thereof. Further, the fuel discharge pipe 44 is pressed into the fuel outlet port 42 from the above so as to occupy substantially an upper half portion thereof, while substantially a lower half portion is formed with a thread 83.

Before closing the opening of the case 30 by the cap 40, the filter member 50 is integrally attached to the cap 40 in advance by tightening the thread 82 of the open tube 79 for fuel outlet to the thread 83 of the fuel outlet port 42. The open tube 79 for fuel outlet is aligned with substantially the center of the filter member 50. By aligning the mounting position of the open tube 79 for fuel outlet with substantially the center of the filter member 50, the weight of the filter member 50 can be evenly supported. However, the open tube 79 for fuel outlet may be arranged to deviate from the center of the filter member 50.

When fixing the open tube 79 for fuel outlet of the filter member 50 to the fuel outlet port 42, the ring-shaped first sealing member 60 is put in the fuel outlet port 42 in advance, and the first sealing member 60 is then sandwiched between a tip of the open tube 79 for fuel outlet and a tip of the fuel discharge pipe 44, thereby forming a sealed portion. The leakage of the discharged fuel into the inlet side is thus prevented. Note that the first sealing member 60 may alternatively be provided at the outer periphery of the open tube 79 for fuel outlet.

Next, the flow of the fuel will be described. The fuel introduced from the fuel supply pipe 43 into the diesel filter 20 as shown by arrow (1) is substantially evenly dispersed in all directions in the upper chamber 63. Then, the fuel flows down through the fuel passage 64 formed between the inner surface of the case 30 and the outer peripheral surface of the element 51 as shown by arrows (2), and is introduced to the water reservoir 62 as shown by arrows (3).

Water content in the fuel is separated in the water reservoir 62, and the fuel free from the water content moves upward as shown by arrows (4). Then, the fuel passes through the element 51 as shown by arrows (5) so that foreign matter contained in the fuel is removed. After removal of the foreign matter, the fuel reaches the upper space 56 above the element 51. Then, the fuel is discharged via the open tube 79 for fuel outlet, the fuel outlet port 42 and the fuel discharge pipe 44 as shown by arrow (6).

Also in the third embodiment, the filter member 50 is detachable and includes only two members, namely, the element 51 and the element-holding member 80 provided above the element 51. Thus, production cost can be reduced, and when the element 51 clogs, it is sufficient to replace only the filter member 50 with new one. Moreover, only one sealed portion of the filter member 50 and another member (the cap 40 in this case) is provided as in the case of the first embodiment. Accordingly, the structure of the filter element is more simplified than that of the related art including two sealed portions.

Figure 10:
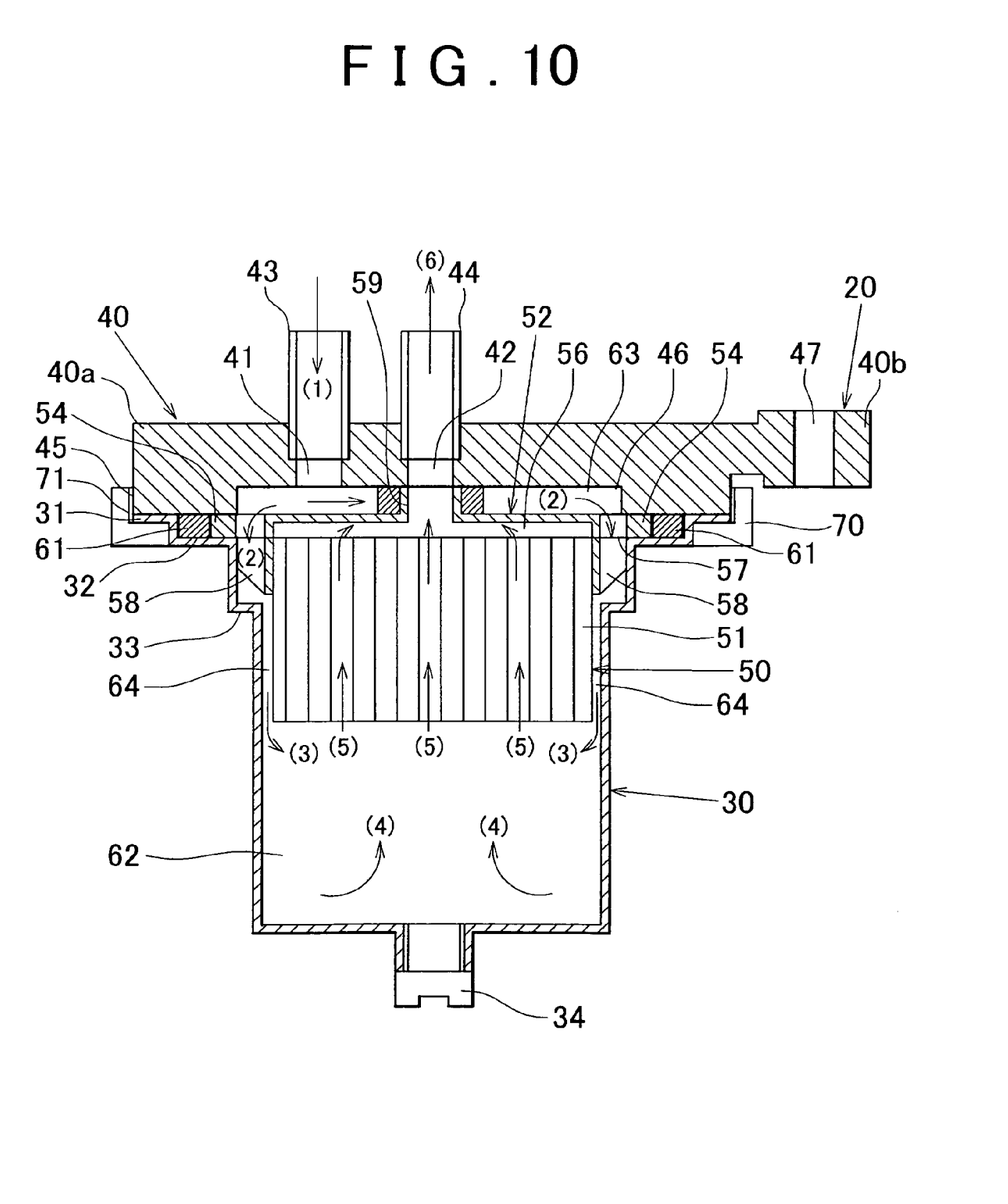
FIG. 10 is a cross sectional view of another diesel filter.

FIG. 10 is a cross sectional view showing a fourth embodiment of the diesel filter. The fourth embodiment is different from the first embodiment in that the fuel inlet port 41, which is provided in the cap 40 and into which the fuel supply pipe 43 is pressed, is arranged to deviate from the center of the filter member 50. Note that elements or members equivalent to those in the first embodiment are denoted by like reference numerals and detailed description thereof will be omitted.

The case 30, the cap 40, the filter member 50, and the fastening member 70 included in the diesel filter 20 are the same as those in the first embodiment except the position of the fuel inlet port 41 provided in the cap 40. More specifically, the fuel inlet port 41 provided in the cap 40 is offset from the center of the filter member 50. FIG. 10 shows the case where the fuel outlet port 42 is aligned with the center of the filter member 50. However, the fuel outlet port 42 may be offset from it. Further, the element-holding member 80 shown in FIG. 9 may be employed as element-holding means.

FIG. 11 shows experiment results. FIG. 11 shows the volume of water retained in the water reservoir 62 in units of mL with respect to the flow rate of the fuel flowing into the diesel filter 20. The water volumes mL corresponding to respective flow rates were compared. The least water volume was detected in the case of using a center-flow diesel filter described as the related art. Then, the water volume was increased in the following order: a center-inlet side-flow diesel filter described as the related art in which the fuel inlet port is aligned with the center of the filter member; a 20 mm-offset-inlet side-flow diesel filter in which the fuel inlet port is offset from the center of the filter member by 20 mm; and a 30 mm-offset inlet side-flow diesel filter in which the fuel inlet port is offset from the center of the filter member by 30 mm. The experiment results show that the more the fuel inlet port 41 is offset from the center of the filter member 50, the more the water retainability in the water reservoir 62 is enhanced.

The experiment results are analyzed in the following manner. The fuel flowing down from the fuel inlet port 41 to the top surface of the filter member 50 disperses in all directions while flowing over the horizontal top surface of the filter member 50. When the fuel inlet port 41 is offset from the center of the filter member 50, the distance that the fuel flows before flowing down to the fuel passage 64 varies. As the flow distance becomes shorter, the water content in the fuel becomes larger water droplets, falling down to the water reservoir 62. The large droplets are thus retained in the water reservoir 62 substantially as they are.

Next, the flow of the fuel will be described. The fuel introduced from the fuel supply pipe 43 into the diesel filter 20, i.e., through a position offset from the center of the diesel filter 20, as shown by arrow (1) is dispersed in all directions in the upper chamber 63. Then, the fuel flows down from the notch spaces 78 to the fuel passage 64 formed between the inner surface of the case 30 and the outer peripheral surface of the element 51 as shown by arrows (2), and is introduced to the water reservoir 62 as shown by arrows (3). In this case, the fuel flowing as illustrated by arrow (2) on the right side of FIG. 10 flows a long distance, so that the water contained in the fuel is atomized to fall down to the fuel passage 64. Meanwhile, the fuel flowing as illustrated by arrow (2) on the left side of FIG. 10 flows a short distance before flowing down to the fuel passage 64. Accordingly, the water contained in the fuel falls down through the fuel passage 64 in the form of large water droplets to fall down to the water reservoir 62, and the large water droplets are retained therein as they are.

Water content in the fuel is separated in the water reservoir 62, and the fuel, from which a larger amount of water has been removed, moves upward as shown by arrows (4). Then, the fuel passes through the element 51 as shown by arrows (5) so that foreign matter contained in the fuel is removed. After removal of the foreign matter, the fuel reaches the upper space 56 above the element 51. Then, the fuel is discharged via the opening 59 for fuel outlet, the fuel outlet port 42 and the fuel discharge pipe 44 as shown by arrow (6).

According to the fourth embodiment, the water retainability in the water reservoir 62 can be improved more. Further, the filter member 50 is detachable and includes only two members, namely, the element 51 and the element-holding member 75 provided above the element 51. Therefore, when the element 51 clogs, it is sufficient to replace only the filter member 50 with new one, thereby reducing maintenance cost. Moreover, only one sealed portion of the filter member 50 and another member (the cap 40 in this case) is provided as in the case of the first embodiment. Accordingly, the structure of the filter element is more simplified than that of the related art including two sealed portions.

According to the first to fourth embodiments, firstly, a side-flow diesel filter is employed in which the fuel introduced from the fuel inlet port to a portion above the element-holding member is introduced to the water reservoir via the passage formed between the inner peripheral surface of the case and the outer peripheral surface of the element. Thus, the fuel is dispersed and introduced to the water reservoir. The atomization of water in the water reservoir is suppressed and more water can thus be retained in the water reservoir, compared to the case where a center-flow diesel filter is employed. Secondly, the filter member is detachably housed in the case, and sealing between the filter member and another member is accomplished, when the opening of the case is closed by the cap, by the sealed portion at the opening only. Thus, the structure of the filter member can be simplified, and the number of parts can be reduced, thereby reducing production cost. In addition, disassembly can be easily performed at the time of disposal of the diesel filter, which is advantageous to deal with environmental issues.

Further, by forming the element from a wound filter element, the production becomes easier compared to, for example, a known pleated filter element. Thus, production cost is reduced. In addition, the filtration area can be increased compared to a pleated filter element, resulting in improved filtration efficiency.

By making the case from a metal material, impact resistance of the case is improved. Thus, the degree of freedom of the mounting position of the diesel filter can be increased, resulting in further reduction in production cost.

The outer peripheral surface of the element-holding member is provided with a flange having notches for allowing the fuel to flow therethrough. When the opening of the case is closed by the cap, the flange is held by the cap and the case. Thus, the structure for holding the filter member can be simplified, leading to further reduction in production cost. Further, it is possible to prevent the sealing material (the second sealing material 61) from being cut by excessive compression due to deformation of the case that is caused by collision (impact) and groove formation for retaining the sealing material (the second sealing material 61). Thus, fuel leakage can be prevented.

The outer periphery of the element-holding member is provided with a plurality of bar ribs that downwardly extend. When the opening of the case is closed by the cap, the bar ribs are in contact with and held by a stepped portion of the case. Thus, the structure for holding the filter member can be simplified, resulting in further reduction in production cost.

The top surface of the element-holding member is provided with an open tube for allowing the fuel to flow therethrough, and the open tube is held directly by the cap. Thus, the holding structure of the filter element can be simplified, achieving further reduction in production cost.

The fuel inlet port is offset from the center of the filter member in the foregoing embodiments of the invention. Meanwhile, in the side-flow diesel filter described as the related art, fuel is introduced to the water reservoir via the passage provided between the inner peripheral surface of the case and the outer peripheral surface of the element. Although this diesel filter has a certain degree of water retainability, the water contained in the fuel introduced from the fuel inlet port is substantially evenly dispersed in all directions due to the fuel inlet being arranged at the center, and the fuel is then introduced to the water reservoir, allowing the water to be atomized to a certain degree. Nevertheless, it is true that such a side-flow diesel filter realizes better water retainability than a center-flow diesel filter, as indicated by the diagram in FIG. 11. However, the water retainability of such a side-flow diesel filter is not always sufficient. On the other hand, as indicated by the diagram in FIG. 11, experiment results show that the more the fuel inlet port is offset from the center of the filter member, the more water retainability is enhanced. The experiment results are analyzed as follows. When the distance between the fuel inlet port and a point at which the fuel begins to fall down is short, the fuel flows only a short distance before falling down, so atomization of the water in the fuel is not much facilitated. As a result, large droplets of water fall down to the water reservoir, and are retained in the water reservoir as they are.

What is claimed is:

1. A diesel filter comprising:
a case including an opening that is upwardly opened;
a cap detachably attached to the opening of the case for closing the opening; and
a filter member detachably housed in the case, the filter member including an element and an element-holding member for holding an upper part of the element, wherein:
in a state where the filter member is housed in the case, a water reservoir is formed in the case below the filter member, and a passage is formed between an inner peripheral surface of the case and an outer peripheral surface of the element so as to introduce fuel that has been introduced to a portion above the element-holding member into the water reservoir,
the element-holding member has an opening for allowing the fuel to flow out from the element, the opening being in communication with a fuel outlet port formed in the cap,
wherein the element-holding member holds the upper part of the element such that a space is maintained above the element between a top surface of the element and a bottom surface of the element-holding member, and
the element-holding member includes a flange which is provided at an outer periphery of the element-holding member and which includes openings through which the fuel flows,
the flange is held by the cap and the case in a state where the flange of the element-holding member is placed on a top surface of a middle stepped portion of the case, the cap is placed on a top surface of an upper stepped portion of the case, and the opening of the case is closed by the cap, and
a sealing member is placed in direct contact with the middle stepped portion and is sandwiched between the middle stepped portion and the cap.

2. The filter according to claim 1, wherein;
the element includes a wound filter element.

3. The filter according to claim 1, wherein;
the case is made of metal.

4. The filter according to claim 1, wherein;
the element-holding member includes a plurality of bar ribs that are provided at an outer periphery of the element-holding member so as to extend downwardly, and
the bar ribs are in contact with and held by a stepped portion of the case in a state where the opening of the case is closed by the cap.

5. The filter according to claim 1, wherein;
the element-holding member includes an open tube which is provided at a top surface of the element-holding member, through which the fuel flows and which is held directly by the cap.

6. The filter according to claim 1, wherein;
the fuel outlet port passes through the cap in a vertical direction.

7. The filter according to claim 1, wherein;
the fuel is introduced to a portion above the element-holding member from a fuel inlet port, and the fuel inlet port is offset from the center of the filter member.

8. The filter according to claim 7, wherein;
the fuel inlet port is formed in the cap, and passes through the cap in a vertical direction.

9. The filter according to claim 1, wherein;
the diesel filter is used in a fuel system of a vehicle.

10. The filter according to claim 1, further comprising:
a fastening member for fixing the case to the cap.

11. The filter according to claim 10, wherein;
the fastening member includes a thread, and the thread is tightened to a corresponding thread in the cap.

12. The filter according to claim 1, wherein;
a connecting portion between the opening of the element-holding member and the fuel outlet port of the cap is sealed.

13. The filter according to claim 1, wherein;
the element-holding member comprises a body with an inner diameter which is substantially the same as the outer diameter of the element.

14. The filter according to claim 13, wherein;
the body and the element are bonded together water-tightly.

15. The filter according to claim 1, wherein;
the fuel introduced into the water reservoir flows upwardly from the water reservoir through the element, reaches the space between the top surface of the element and the bottom surface of the element-holding member, and is discharged via the opening to the fuel outlet port.

* * * * *